US012099642B2

(12) United States Patent
Bhagwat et al.

(10) Patent No.: US 12,099,642 B2
(45) Date of Patent: Sep. 24, 2024

(54) NO LATENCY HARDWARE INTERPOSER

(71) Applicant: Seagate Technology LLC, Fremont, CA (US)

(72) Inventors: Rajesh Maruti Bhagwat, Pune (IN); Hemant Vitthalrao Mane, Pune (IN); Avinash Suresh Pisal, Pune (IN); Niranjan Anant Pol, Pune (IN)

(73) Assignee: Seagate Technology LLC, Fremont, CA (US)

( * ) Notice: Subject to any disclaimer, the term of this patent is extended or adjusted under 35 U.S.C. 154(b) by 299 days.

(21) Appl. No.: 17/712,395

(22) Filed: Apr. 4, 2022

(65) Prior Publication Data

US 2023/0259661 A1 Aug. 17, 2023

(30) Foreign Application Priority Data

Feb. 14, 2022 (IN) .............................. 202221007727

(51) Int. Cl.
| | |
|---|---|
| *G06F 21/56* | (2013.01) |
| *G06F 21/57* | (2013.01) |
| *G06F 21/71* | (2013.01) |
| *G06F 21/79* | (2013.01) |
| *G06F 21/85* | (2013.01) |

(52) U.S. Cl.
CPC .............. *G06F 21/85* (2013.01); *G06F 21/57* (2013.01)

(58) Field of Classification Search
CPC ........ G06F 21/85; G06F 21/57; G06F 21/554; G06F 21/567; G06F 21/71; G06F 21/79; G06F 2221/034
See application file for complete search history.

(56) References Cited

U.S. PATENT DOCUMENTS

| | | | |
|---|---|---|---|
| 8,402,196 B2 | 3/2013 | Davis et al. | |
| 9,135,015 B1 | 9/2015 | Mizrahi et al. | |
| 9,183,087 B2 | 11/2015 | DeCenzo | |
| 9,882,667 B2 | 1/2018 | Hartlmueller et al. | |
| 10,178,181 B2 | 1/2019 | Ben-Nun et al. | |
| 10,574,638 B2 | 2/2020 | Tus | |
| 10,605,858 B2 | 3/2020 | Whetsel | |
| 10,678,953 B1 | 6/2020 | Allo et al. | |
| 10,853,085 B2 | 12/2020 | Luong et al. | |
| 2014/0089609 A1* | 3/2014 | Kegel | H01L 25/0652 711/E12.001 |
| 2015/0028918 A1* | 1/2015 | Hutton | H03K 19/0033 326/9 |
| 2020/0041009 A1 | 12/2020 | Miller | |
| 2021/0342169 A1* | 11/2021 | Heinrich | G06F 9/45508 |

\* cited by examiner

*Primary Examiner* — Joseph P Hirl
*Assistant Examiner* — Aayush Aryal
(74) *Attorney, Agent, or Firm* — Kagan Binder, PLLC

(57) ABSTRACT

A data storage system can have a hardware interposer connected inline between a plurality of controllers and a plurality of memories. A bus of the hardware interposer may be monitored with a security breach monitor of the hardware interposer to allow a deviation from a predetermined address range to be detected by the security breach monitor, which prompts the security breach monitor to block access through the hardware interposer for a first controller of the plurality of controllers.

20 Claims, 5 Drawing Sheets

200 ⭢

| 202 | CONNECT UPSTREAM HOST/CONTROLLER TO DOWNSTREAM MEMORIES |
| --- | --- |
| 204 | DETECT AND CONFIRM IDENTITY OF HOSTS AND MEMORIES |
| 206 | INITIATE FIRMWARE UPGRADE |
| 208 | DISABLE PASSTHROUGH FROM HOST TO MEMORY |
| 210 | UPGRADE FIRMWARE WITH AT LEAST ONE ERASE AND PROGRAM OPERATION |
| 212 | VERIFY TRUSTWORTHINESS OF UPSTREAM HOST |
| 214 | ACTIVATE PASSTHROUGH FROM HOSTS TO MEMORIES |

| 222 | DETECT BOOT CONDITION |
| --- | --- |
| 224 | SYNCHRONIZE INTERPOSER CLOCK CYCLE TO EXTERNAL CONTROLLER |
| 226 | PERFORM TEST OF EXTERNAL MEMORY TO VERIFY TRUSTWORTHINESS |
| 228 | PROVIDE SECURITY INFORMATION TO NEWLY INITIALIZED COMPONENT |

FIG. 7

NO LATENCY HARDWARE INTERPOSER

RELATED APPLICATIONS

This application makes a claim of foreign priority under 35 U.S.C. 119 to Indian Patent Application No. 202221007727 filed Feb. 14, 2022, the contents of which are hereby incorporated by reference.

SUMMARY

Embodiments of the present disclosure are generally directed to a hardware interposer for a Root of Trust (RoT) that is utilized in a data storage system. A hardware interposer, in some embodiments, is connected inline between a plurality of controllers and a plurality of memories. A bus of the hardware interposer is monitored with a security breach monitor of the hardware interposer to allow a deviation from a predetermined address range to be detected by the security breach monitor, which prompts the security breach monitor to block access through the hardware interposer for a first controller of the plurality of controllers.

Other embodiments connect a hardware interposer inline between at least one controller and at least one memory with the hardware interposer having an internal controller and a security breach monitor respectively configured to monitor a bus of the hardware interposer and block passthrough access to the at least one controller in response to a detected data access command to the at least one memory that is outside a range stored in the hardware interposer.

In accordance with various embodiments, a hardware interposer is connected between at least one controller and a memory to allow a first controller of the at least one controller to be tested with a security breach monitor of the hardware interposer by requesting a predetermined sequence of commands from the first controller. Access through the hardware interposer is blocked for the first controller in response to the predetermined sequence of commands not being returned from the first controller

BRIEF DESCRIPTION OF THE DRAWINGS

FIG. 6 displays an example flowchart for a command process that may be conducted in a data storage system in accordance with assorted embodiments.

FIG. 7 is an example flowchart for a boot process that may be carried out in a data storage system in accordance with various embodiments.

DETAILED DESCRIPTION

Figure 1:
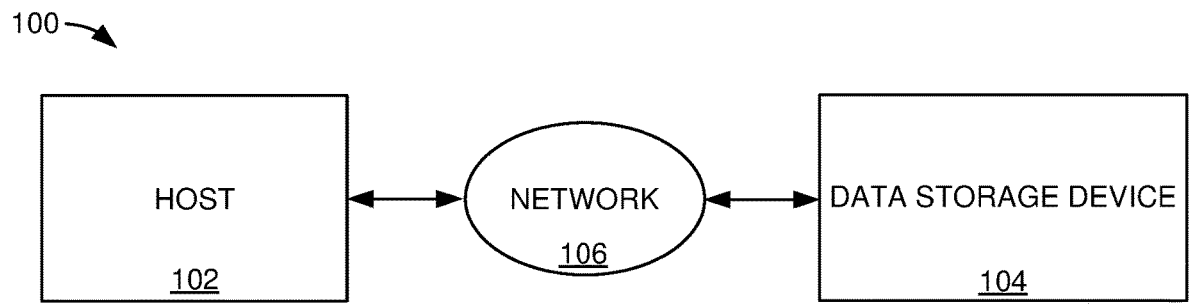
FIG. 1 provides a functional block representation of a data storage system in which various embodiments can be practiced.

Embodiments of a data storage system, without limitation, are generally directed to a hardware Root of Trust (RoT) that contributes no latency, guards against security breaches, and does not increase system boot/initialization times A hardware RoT can be a highly reliable source that can always be trusted within a cryptographic system. A RoT may be protected by tamper resistant mechanisms that can utilize persistent memory where security and/or initialization/boot firmware is securely stored. A tamper resistant mechanism can validate code before allowing the code to be executed on a downstream processor/controller, which can provide immunity from software attacks. The RoT, in some embodiments, protects a data storage system not only during boot/initialization times, but also during firmware upgrades to prevent third-party attackers from altering the contents of the firmware stored in a persistent memory. Ideally, tamper resistant mechanisms additionally protect against physical attacks.

It is contemplated that data storage systems can operate without a hardware RoT. Such systems can employ external non-volatile memory that acts as persistent memory and is directly connected to a master interface of a system controller/processor. The use of external memory without a hardware RoT may provide some security for a data storage system, but can be susceptible to attacks that alter the contents of the external memory by loading malicious firmware code. Thus, some embodiments utilize a trusted platform module (TPM) with embedded, or external, non-volatile memory to provide system security with robust resistance to third-party attackers.

With the use of non-volatile memory embedded in a system on chip with a hardware RoT or TPM, physical tampering to the firmware is prevented. However, the position of the memory can be more costly in terms of the amount of silicon area on the system on chip. Embedded memory further limits the ability to increase the capacity of the memory over time, which can exacerbate the limited lifespan of some non-volatile memory cells due to the replacement of on-chip memory not being possible. Hence, hardware RoT with embedded memory can be robust, but costly, while the use of external non-volatile memory with a hardware RoT can be robust and cost effective.

Employing a RoT or TPM with one or more external non-volatile memories can be cost-effective while allowing placement or supplementation over time, which provides flexibility to choose variable sizes of independent external memories. Utilization of external non-volatile memories also allows RoT/TPM to be implemented (retro-fitted) in existing data storage systems. Yet, external memories can add to a bill of materials for a system, which can increase cost and/or complexity. It is noted that assorted embodiments of a data storage system are directed to the use of external non-volatile memory as persistent memory for a hardware RoT.

Accordingly, an inline interposer is employed to secure operation of a data storage system without adding latency or boot/initialization time. It is contemplated that a data storage system can be made to be highly secure through the use of an interposer, even without a hardware RoT. In some embodiments, an interposer constantly monitors activity of one or more bus and flags an alert in case of any deviation against a programmed set of addresses, commands, and/or sequences. Interposer logic can be utilized inside a data storage controller and can be retro-fitted in systems that did not previously utilize and inline interposer. Other embodiments utilize an inline interposer to provide system-wide security by controlling access to external persistent memory from any system host, device, or controller.

An example data storage system 100 in which assorted embodiments of an inline interposer can be employed is displayed as a block representation in FIG. 1. The system 100 can connect any number of hosts 102 to any number of downstream data storage devices 104 via a wired and/or wireless network 106. It is contemplated that hosts 102 and data storage devices 104 are physically located in the same facility or in different locations, such as different cities, countries, or continents. The ability to connect data storage devices 104 with different capabilities, such as capacity, data access speed, or security protocol, to one or more hosts 102 via one or more network signal pathways allows the data storage system 100 to provide robust data storage, data retrieval, and security.

However, the interconnection of hosts 102 and data storage devices 104 with network 106 pathways can provide conduits for third-party attackers to infiltrate, steal, or otherwise manipulate data, firmware, and/or protocol to jeopardize the integrity of the hardware and/or software of the system 100. Hence, security measures for some data storage systems 100 involve cryptographic aspects that serve to protect hardware and/or software portions of the system 100. While cryptographic aspects can aid in ensuring third-party attacks are prevented, or at least mitigated, the protection of the cryptographic aspects is paramount to the security and integrity of the data, hardware, and operating software of the system 100. Accordingly, data storage systems 100 can be configured with hardware and/or software directed to securing the trustworthiness of at least cryptographic aspects of the system 100, such as aspects located or executed at the host, device, or network level.

Figure 2:
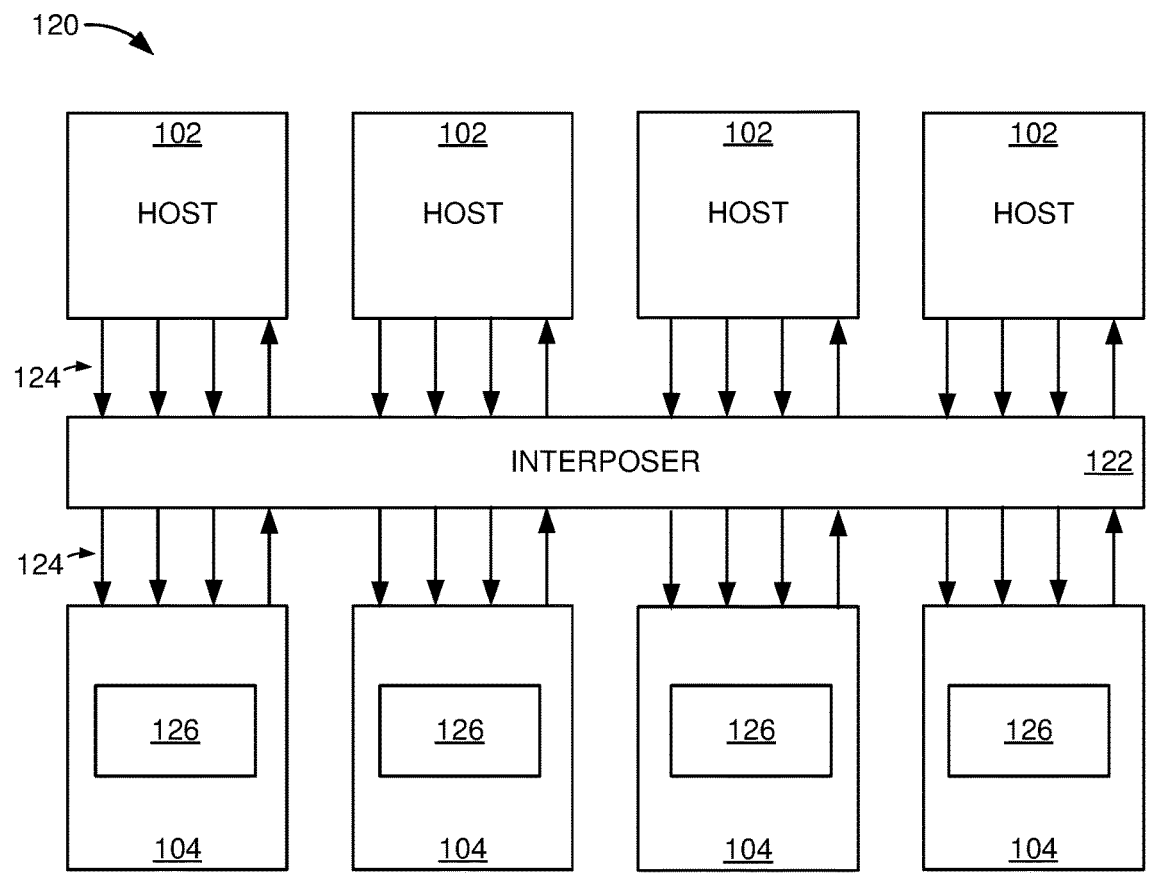
FIG. 2 shows a block representation of portions of an example data storage system arranged in accordance with some embodiments.

FIG. 2 depicts a block representation of portions of an example data storage system 120 arranged in accordance with assorted embodiments. A number of hosts 102 access a number of data storage devices 104 via one or more interposers 122. While not required or limiting, each host 102 can act as a master for one or more data storage devices 104 according to a selected protocol, such as SPI, QSPI, I2C, I3C, ONFI, or Toggle. Each host 102 can concurrently utilize multiple signal pathways 124 to pass signals and data to, and from, one or more non-volatile memories 126 positioned in the respective devices 104.

The interposer 122 can be realized in hardware and/or software to provide tamper resistance mechanisms for the system 120 and, in the case of hardware interposer configurations, physical interface for the connection and/or replacement of data storage devices 104. As such, the interposer 122 may be positioned on-site with one or more data storage devices 104, which can increase the resistance of the system 120 to physical third-party attacks that physically connect or replace a data storage device with an intruder device or software. The use of the interposer 122 can protect the system 120 during initialization (boot) operations as well as during the satisfaction of host-generated data access requests and data maintenance operations, such as garbage collection, error resolution, and memory cell reference calibration.

Figure 3:
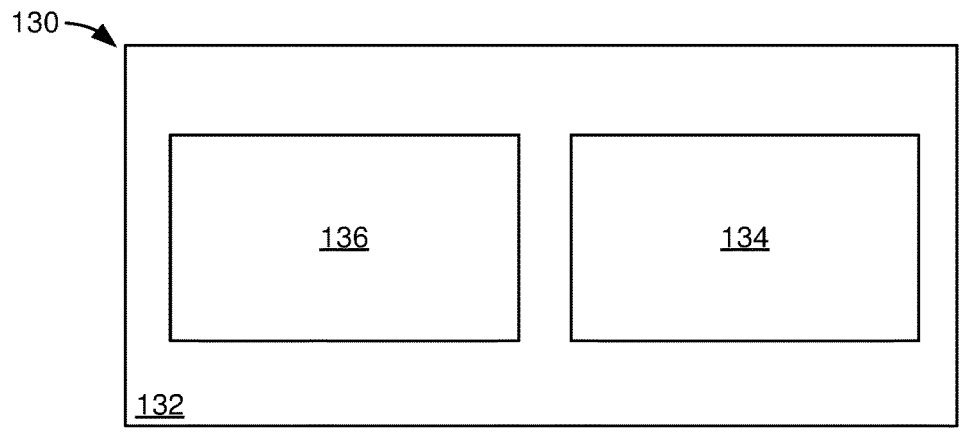
FIG. 3 shows a block representation of portions of an example data storage system configured in accordance with assorted embodiments.

FIG. 3 illustrates a block representation of portions of a data storage system 130 arranged in accordance with various embodiments. The system 130 employs a hardware interposer 132 configured as a system on chip (SoC) with embedded non-volatile memory (NVM) 134 physically packaged with a root of trust (RoT) module 136. The RoT module 136 can utilize the embedded NVM 134 to monitor boot and data storage operations between hosts 102 and downstream data storage devices 104 to provide tamper resistance to various security and encryption aspects of the system. For instance, use of the embedded NVM 134 can prevent physical tampering with the firmware of the system 130.

However, employing the embedded NVM 134, compared to externally connected persistent memory, can be costly in terms of greater surface area of the SoC required for positioning the NVM 134 in the package. It is noted that embedded NVM 134 can have a lifespan limited by the number of data accesses, heat, and/or errors over time, which compounds the difficulty with embedded NVM 134 not being replaceable or upgraded. These difficulties with embedded NVM 134 for a hardware RoT interposer can be exacerbated by the addition of latency during the monitoring of signals and/or data between hosts 102 and downstream data storage devices 104. Such latency can be caused by the serial protocol for signal/data transmission that have fixed frame formats to send commands and expect responses at the end of a command cycle. The presence of latency prevents the RoT module 136 from effectively blocking access to the system 130 by an attacker.

In addition, the hardware RoT of the system 130 can suffer from increased boot times for hardware and/or software as commands, signals, and/or data are analyzed and verified before passing to a selected destination. Hence, existing hardware RoT systems 130 have operational issues that prevent optimal utilization in data storage networks, particularly in large systems that utilize numerous data storage device concurrently. Accordingly, assorted embodiments are directed to an interposer utilizing external non-volatile memory as persistent memory for RoT operations without imposing latency or increased boot times.

Figure 4:
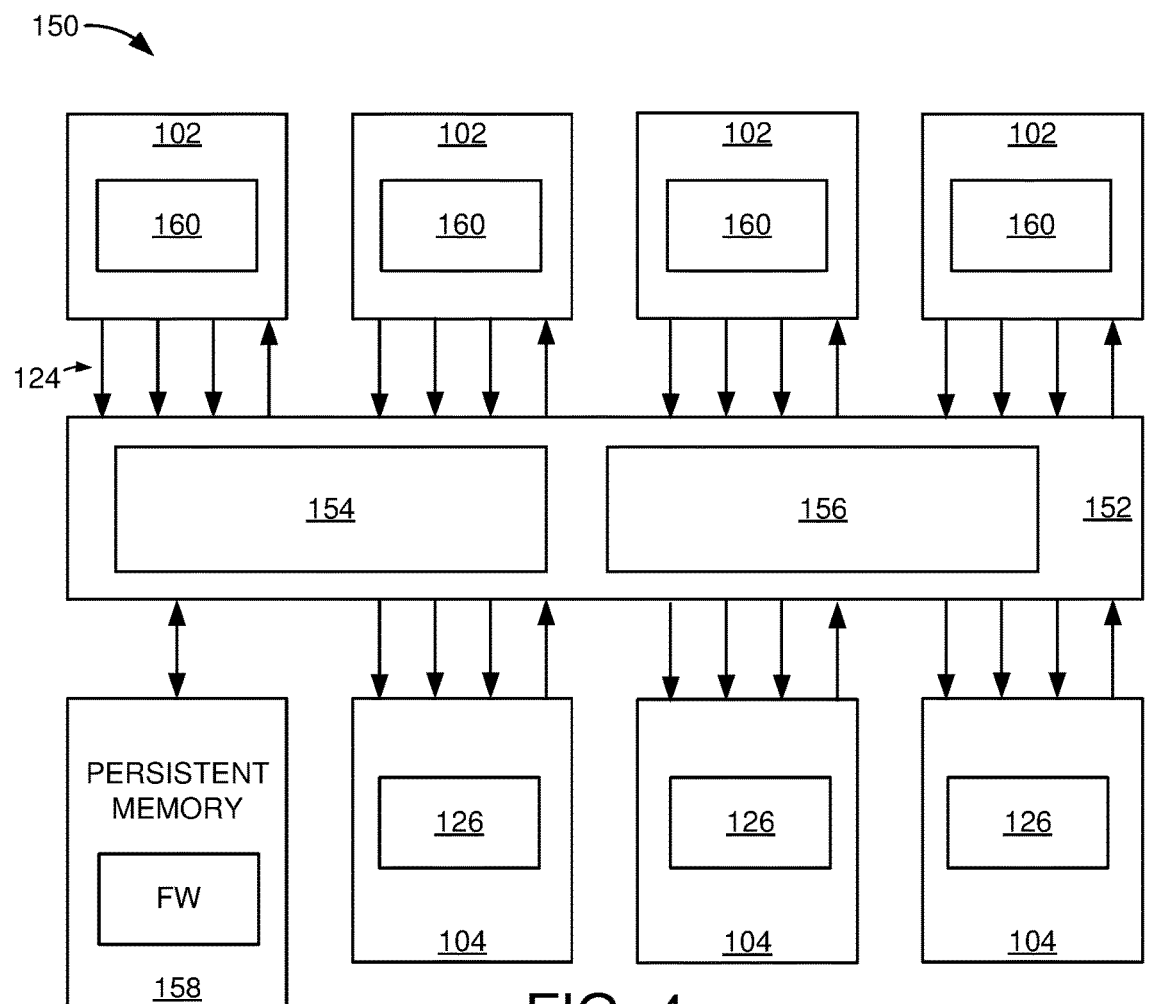
FIG. 4 illustrates a block representation of portions of an example data storage system utilized in accordance with various embodiments.

FIG. 4 depicts a block representation of portions of an example data storage system 150 configured in accordance with various embodiments. The system 150 employs a hardware RoT interposer 152 positioned between at least one host 102 and at least one downstream data storage device 104. The interposer 152 has a local security breach monitor 154 and an internal master controller 156 that can operate to monitor the issuance of data access commands from the host(s) 102 and the satisfaction of those commands by the downstream devices 104. The interposer 152 may be connected to one or more external non-volatile memories 158 that are dedicated to being persistent memory for the RoT, which corresponds with being protected from access by any host 102 or servicing any host-generated commands.

The security breach monitor 154 and master controller 156 can provide zero latency to boot operations and command issuance, and command satisfaction due to the utilization of the same clock cycle as the downstream device 104. That is, the internal controller 156 operates on the same clock cycle as the external master controller 160 so that the slave data storage device 104 completes a response within that clock cycle, which adds no latency during booting operations or the completion of a command.

The internal controller 156 further ensures the integrity of firmware and other sensitive data stored in the persistent memory 158 by evaluating commands, data access patterns, and other operational information for threats of third-party malicious conduct and intent. The security breach monitor 154 is programmed with different valid address ranges for the downstream data repository to be accessed by the external master 160 and isolates the external memory interface in response to any access outside of the preset valid range to protect the downstream data storage devices 104 and data stored therein. In this way, the security breach monitor 154 with the internal controller 156 pass only valid commands from the external master controller 160 to the downstream memory of the data storage devices 104.

It is contemplated that the external master controller 160 writes a set of sequences to the interposer 152 that changes periodically, which allows the interposer 152 to verify the integrity of the external master controller 160, or any host 102, over time. That is, the internal controller 156 can request a sequence or pattern of commands, data, signals, or tags from the external master controller 160, and/or any externally connected host 102, to verify that genuine trustworthiness of the controller/host. Some embodiments change the request and/or the successful sequence among a preset roster of allowed sequences to further enhance security of the system 150.

By periodically polling the externally connected and command generating aspects of the system 150, the interposer 152 can efficiently identify attempted and successful third-party attacks while maintaining the integrity of the downstream data storage devices 104 and stored data. The ability to conduct such activity on the same clock cycle as the master controller 160, the interposer 152 can provide such verification without adding latency to command issuance and satisfaction.

Figure 5:
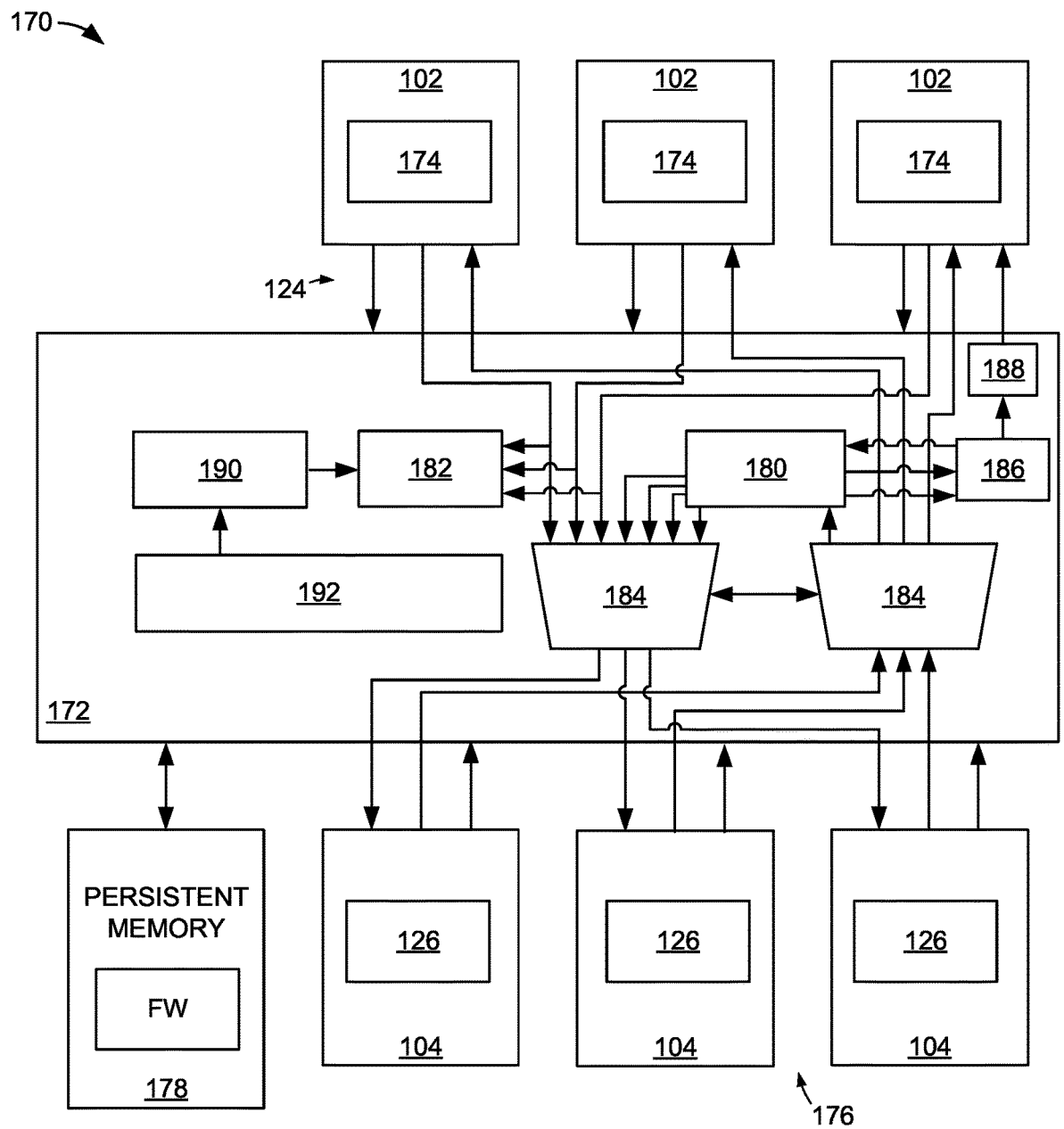
FIG. 5 depicts portions of an example data storage system constructed and operated in accordance with some embodiments.

FIG. 5 depicts portions of an example data storage system 170 constructed and operated in accordance with some embodiments. An interposer 172 is positioned between at least one external master controller 174, such as an external host, and at least one external data repository 176, such as a non-volatile memory of a data storage device. One or more persistent memories 178 can be utilized by the interposer 172 for boot, cryptographic, and security information. At least one internal master controller 180 and security breach monitor 182 may operate independently, or concurrently, to route commands, signals, and data through one or more multiplexers 184. A power sequencer 186 can direct reset and energy consumption by portions of the interposer 172 and/or external master controller 174, which may be facilitated with a power switch 188.

The security breach monitor 182 can access a command logger 190 and security repository 192 that stores information to certify the trustworthiness of commands, hosts, data, and firmware. It is contemplated that the information of the security repository 192 is complementary or redundant from the externally connected persistent memory 178. Although not required or limiting, the interposer 172 can be configured as a single system on chip with assorted electrical interconnections formed of traces through silicon and external aspects connected via a physical interface and/or bus.

The internal master controller 180 can control the initialization of one or more externally connected devices 176, hosts, and/or controllers 174 to ensure the sanity and integrity of at least firmware images. For instance, the internal master controller 180 performs at least one test generated by the controller 180 on an externally connected component to test and verify the trustworthiness of the component, such as an external memory 176, which can play a role in maintaining the integrity of the memory 176 and firmware software stored therein during firmware upgrades.

Some embodiments configure the security breach monitor 182 to continuously, randomly, or periodically monitor activity of one or more bus/interface of the interposer 172. In response to an invalid, or not allowed, command to the bus/interface, the security breach monitor 182 alters the internal master controller 180 and proceeds to block access to one or more downstream memories 176. Similarly, in response to the detection, or prediction, of a data access request to a data address out of a range designated in the security repository 192, the security breach monitor 182 blocks access to at least one downstream memory 176. Optionally, the security breach monitor 182 can detect a break in a predefined set of operational sequences stored in the security repository 192 from an externally connected host/controller 174 and proceed to alert the internal controller 180 and block passthrough access to one or more downstream data repositories 176.

The internal master controller 180 can conduct switching logic to concurrently support multiple different boot devices as well as multiple separate external controllers 174. Via the multiplexers 184, the internal master controller 180 can conduct any number of boot, command monitoring, firmware upgrade, and integrity test operations on the assorted externally connected components without adding latency to the respective operations. That is, the internal master controller 180 may concurrently monitor, test, and execute various operations from assorted different external controllers 174 to initialize a newly connected controller 174, test existing controllers 174, and protect downstream memories 176 by monitoring commands and signals before they reach the respective memories 176.

The incorporation of the power sequencer 186 in the interposer 172 allows for the interruption, or resetting, of electrical power to the external master controller 174 and/or data repository 176. As a non-limiting example, in response to the internal master controller 180 detecting, or predicting, a security threat to hardware or firmware, the reset and power sequencer/controller 186 may choose to reset and/or disable power to the external component to reduce the processing capability of the external component or suspend operation of the suspected source of the security threat. While upgrading firmware, the power sequencer 186, in some embodiments, resets a power cycle to one or more upstream connected master controllers/hosts 174 to effectively mitigate the risk of a third-party malicious attack.

The internal master controller 180 can enable the command logger 190 to store one or more data access commands and/or requested data block addresses to evaluate the integrity of a command source compared to security credentials stored in the security repository 192. It is noted that the internal master controller 180 may monitor incoming commands and addresses in real-time without storing them with the logger 190. However, some embodiments utilize the storage of commands and/or addresses to allow for later analysis and optimization of the security parameters of the security repository 192. That is, the internal master controller 180 can selectively store commands and/or requested data addresses to alter and optimize existing security parameters stored in the security repository 192, which effectively allows the interposer 172 to intelligently adapt to changing security threats over time.

Through the assorted aspects of the interposer 172 that employs a hardware RoT with externally connected persistent memory 178, any number of downstream memories 176 can be protected from malicious activity from upstream hosts in real-time without the addition of command execution latency. The physical intersection of the hosts/controllers 174 and the data repository 176 by the interposer 172 prevents software-only attacks on hardware and software. The physical construction of the interposer 172 further allows for implementation into existing systems, such as with physical connections to a data storage device, within a data storage enclosure, inline between a network node and memory, or connected to a network server.

The utilization of external persistent memory 178, instead of non-volatile memory resident in the interposer 172 circuit package, allows for dynamic persistent memory 178 operation and interchangeability over time, which allows the interposer 172 to provide optimal security performance for a longer period of time. With the assorted embodiments of the internal master controller 180, boot times and firmware upgrades can be conducted more securely, and with no additional operational latency, than conventional hardware RoT configurations. The preexisting security parameters stored in the security repository 192 allows the internal master controller 180 to evaluate and act on suspicious data access commands, address requests, and/or signal patterns within a single clock cycle of the external master controller 174, which results in no additional latency.

FIG. 6 depicts a flowchart of an example firmware upgrade process 200 that can be carried out with the assorted aspects of FIGS. 1-5. A data storage system can initially connect at least one upstream host/controller with at least one downstream data storage device in step 202 via a hardware interposer that is configured with a hardware RoT that employs an external persistent memory. The interposer can physically interconnect the host(s) and data storage device(s) with one or more bus/interface that allow for the concurrent analysis of existing operations as well as the connection of new hosts/devices.

An internal controller of the interposer, in step 204 detects data and hardware identification of downstream devices and confirms the identity of upstream hosts/controllers. The controller, in step 204, can request verification of an upstream host/controller, such as with a predetermined password, key, or certificate. Some embodiments of step 204 involve the internal controller to monitor host/controller activity to verify integrity by confirming a predetermined sequence of data access commands. For instance, the internal controller can request verification form a host/controller that prompts the host/controller to issue a sequence/pattern of data access commands to a downstream data storage device. Such command sequence/pattern verification can supplement, or replace, security validation via a password, key, or certificate.

Confirmation of the integrity and trustworthiness of an upstream host/controller allows step 206 to initiate a firmware upgrade to at least one portion of the data storage system. The initiation of a firmware upgrade in step 206 may occur at scheduled times, in response to detected, or predicted, system activity, upon receipt of an attempted attack, discovery of a successful malicious attack, or availability of a new firmware version. It is contemplated that step 206 is executed in response to an invalid confirmation of the integrity and trustworthiness of an upstream host/controller. In such a case, the interposer controller can initiate a firmware upgrade in an attempt to mitigate any prior successful third-party attack and/or prevent an ongoing malicious attack on the data storage system.

The initiation of a firmware upgrade in step 206 prompts step 208 to disable passthrough connection between upstream hosts/controllers and downstream data storage devices in order to connect the internal host/controller with a single external memory, the persistent memory in which the firmware is resident. Step 210 proceeds to upgrade the existing firmware, which may involve erasing and/or programming some, or all, of the firmware stored in the externally connected persistent memory. Once the upgrade to firmware has been completed, or concurrently with the firmware upgrade, step 212 can verify the trustworthiness of upstream hosts/controllers with one or more verification means, such as password or data access sequence responses. The verification of a host/controller allows the interposer to activate passthrough service to at least one downstream data storage device while quarantining the persistent memory.

FIG. 7 conveys an example initialization process 220 that can be carried out by a data storage system employing a hardware RoT interposer with an externally connected persistent memory. In accordance with various embodiments, step 222 detects a boot condition, which can be characterized as a power reset of a previously connected component or new connection of a component to the interposer containing the hardware RoT. The internal interposer controller, in step 224, synchronizes the interposer clock cycle with a selected upstream master controller, which provides no latency for the analysis and execution of interposer activity as operations are completed within a single master controller clock cycle.

Next, step 226 performs one or more tests of externally connected memory to verify the authenticity and trustworthiness of the signals originating from the memory as well as the data read from the memory. The verification of a memory can involve any number of tests, such as password or certificate recall, detection of firmware version, or detecting hardware characteristics, such as available capacity, read latency, or serial number. It is contemplated that step 226 involves the generation of a test pattern of data writes and/or reads to discover if any portion of the memory has been tampered with or is controlled by a malicious third-party. It is noted that carrying out the assorted testing of external memory on the same clock cycle as the master controller adds no latency to the initialization of the externally connected component.

The process 220 concludes with the internal interposer controller providing security information to the newly initialized component in step 228, such as cryptographic algorithms, encryption keys, or passwords. By providing such security information after the externally connected component has been verified as trustworthy, the interposer maintains the integrity of the security information, which protects the other aspects of the data storage system. The use of a hardware RoT with an external persistent memory can emphasize the testing and verification of connected components during initialization before trusting the component or sharing system security information. The ability to conduct assorted security tests without adding latency allows the interposer to conduct more thorough testing and analysis during initialization than if security verification added latency to the initialization process.

Figure 8:
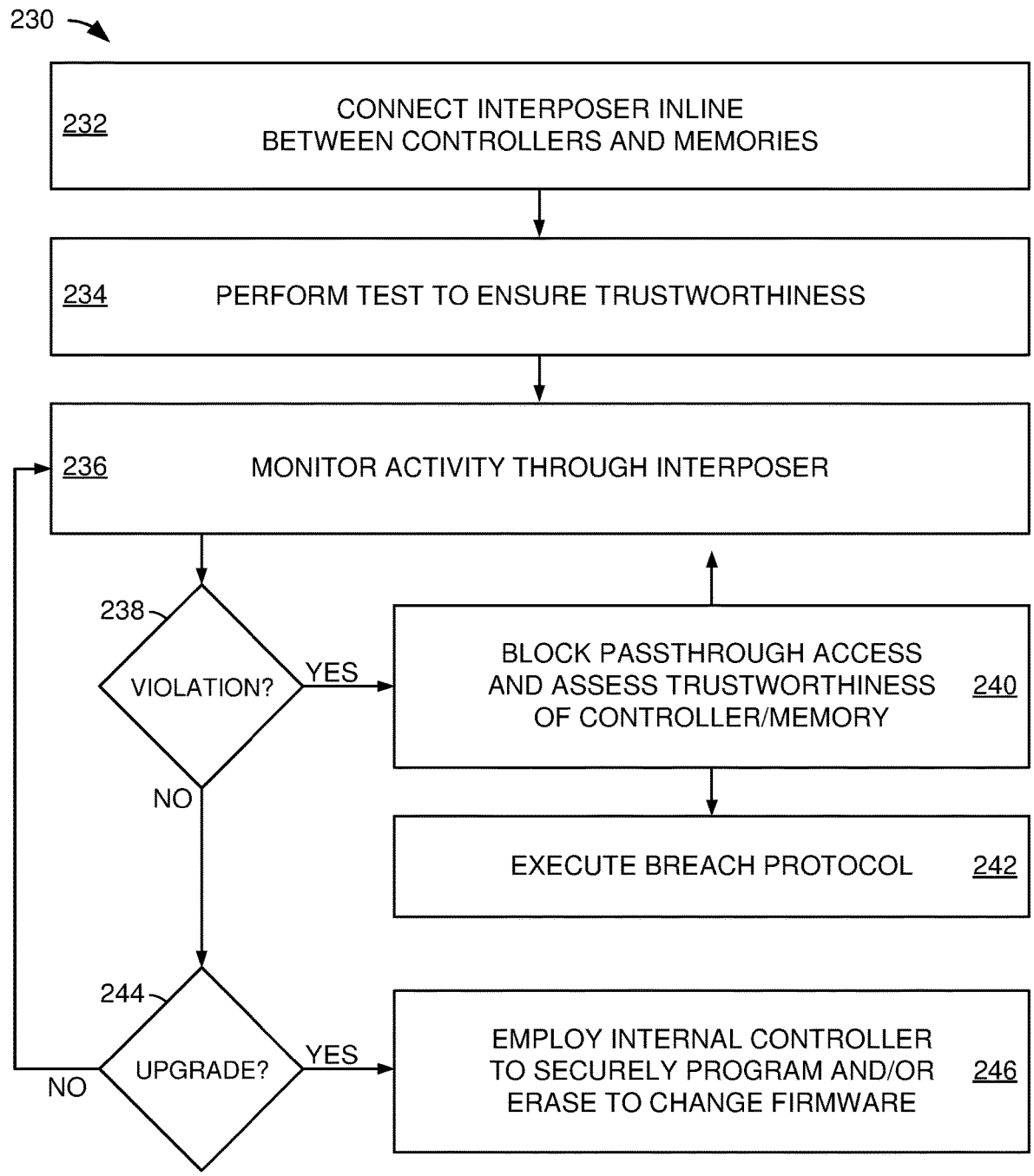
FIG. 8 depicts an example monitoring routine that can be executed in a data storage system in accordance with some embodiments.

FIG. 8 depicts an example monitoring routine 230 that can be carried out with various embodiments of an interposer. The hardware interposer is connected inline, in step 232, between one or more upstream controllers and one or more downstream memories as part of a data storage system. It is noted that the interposer can be configured with, or without, an external persistent memory that acts as an RoT. In the configuration where no RoT is employed, the interposer acts to intelligently monitor traffic between controllers and memories to detect violations, errors, and/or third-party attacks, which allows the interposer to take action to stop, or at least mitigate performance and/or security degradations. System configurations that employ a hardware RoT external to the interposer can also utilize the intelligent monitoring of the interposer, but with added firmware upgrade functions, as generally shown in FIG. 8.

The connection of the interposer allows portions of a data storage system to be initialized, such as with process 220 of FIG. 7, while the internal controller of the interposer performs one or more tests to ensure the integrity and trustworthiness of memories/controllers undergoing initialization in step 234. The validated data storage system proceeds to issue and service data access commands, data maintenance operations, and correct errors/failures. Step 236 utilizes the interposer to monitor the assorted activity between upstream controllers and downstream memories and compare the activity to predetermined sets of trustworthy ranges stored in the interposer and accessed by the security breach monitor.

It is noted that the monitoring and evaluation of activity between controllers and memories in step 236 is conducted with no latency due to the interposer adjusting to have the same clock cycle as the upstream controller initiating the activity being evaluated. As such, step 236 may adjust to different clock cycles during the evaluation of commands and data from different upstream controllers. The utilization of different clock cycles can also effectuate no latency during initialization of different system components.

The monitoring of activity in step 236 allows decision 238 to determine if a violation to one or more predetermined sets of trustworthy system activity has occurred. For instance, the security breach monitor in decision 238 determines if current, and/or pending, commands, data, data destination addresses, and/or command sequences are within predetermined ranges set as valid and trustworthy. It is noted that the predetermined ranges can be periodically altered, updated, and otherwise changed to adjust what system activity is potentially hazardous to the system. If a violation has occurred, or is predicted to occur, step 240 blocks passthrough access to at least one controller and/or memory while assessing the trustworthiness of the controller/memory conducting suspect activity. While not required or limiting, the interposer can assess trustworthiness by requesting one or more security credentials, such as certificates, passwords, or signatures, from a controller and/or writing and erasing test data to a memory.

In the event the interposer determines the violation did not correspond with a corrupted, or otherwise compromised, controller/memory, passthrough access is returned via the interposer and step 236 monitors future activity, which may occur after the interposer conducts a power cycle to reset the controller/memory. However, a determination that a violation corresponds with a corrupted/compromised controller/memory causes the interposer to block passthrough access and attempt to remove power to the controller/memory while prompting a security breach protocol in step 242 that can isolate any corrupted firmware or data.

The cyclic execution of step 236 with decision 238 can be conducted any number of times and for any length of time. The interposer, in decision 244, can determine if an upgrade to firmware is scheduled or prompted by a violation from decision 238. Step 246 blocks passthrough access in the interposer so that a single controller can access and upgrade the firmware of a downstream memory. For firmware upgrades to the hardware RoT resident in a persistent external memory, step 246 employs the internal controller to securely erase and program data to ensure the firmware is not compromised, copied, or altered in an inadvertent manner.

Through the assorted embodiments of a hardware interposer positioned inline between a controller and memory in a data storage system, the boot time of one or more system components, such as controllers or memories, is not inflated due to the interposer due to the interposer choosing a clock cycle that matches the component being initiated, which adds no latency. The hardware interposer ensures the integrity of existing firmware with an internal controller that monitors activity and blocks access to the firmware in response to detection of suspicious behavior. Some embodiments of the hardware interposer provide read only access for external controllers to ensure a secure boot process. A security breach monitor utilizes predetermined ranges of data access activity to intelligently monitor system activity and selectively prevent passthrough access and mitigate degradation of system performance and security.

The ability to utilize a hardware interposer that provides no latency for boot and activity monitoring allows for more efficient evaluation and reaction to suspicious behavior that can compromise data and system components. The ability to secure access pathways through the hardware interposer can increase the reliability of firmware upgrades. As such, the various capabilities of a hardware interposer provides optimized system activity monitoring and control without degrading timing or data access command performance.

What is claimed is:

1. An apparatus comprising a hardware interposer connected inline between at least one controller and at least one memory, the hardware interposer comprising an internal controller and a security breach monitor configured to monitor a bus of the hardware interposer and block passthrough access to the at least one controller in response to a detected data access command to the at least one memory that is outside a predetermined valid range stored in the hardware interposer.

2. The apparatus of claim 1, wherein the hardware interposer is connected to an external persistent memory where a root of trust is stored.

3. The apparatus of claim 1, wherein the hardware interposer acts without a root of trust.

4. The apparatus of claim 1, wherein a single hardware interposer controls access from a plurality of controllers to a plurality of memories.

5. The apparatus of claim 1, wherein the hardware interposer comprises a first multiplexer and a second multiplexer concurrently blocking access for a first controller of the at least one controller to a first memory of the at least one memory while allowing access from a second controller of the at least one controller to the first memory.

6. A method comprising:
connecting a hardware interposer inline between a plurality of controllers and a plurality of memories;
monitoring a bus of the hardware interposer with a security breach monitor of the hardware interposer; and
blocking access through the hardware interposer for a first controller of the plurality of controllers in response to a deviation from a predetermined valid address range detected by the security breach monitor.

7. The method of claim 6, wherein the security breach monitor allows passthrough the hardware interposer for a second controller of the plurality of controllers while blocking passthrough access to the first controller.

8. The method of claim 6, wherein the security breach monitor blocks access through the hardware interposer for a second controller of the plurality of controllers concurrently while blocking access through the hardware interposer for the first controller.

9. The method of claim 6, wherein the predetermined valid address range is stored in memory of the hardware interposer.

10. The method of claim 6, wherein the predetermined valid address range is altered in response to logged activity from the plurality of controllers to the plurality of memories.

11. The method of claim 6, wherein the predetermined valid address range corresponds to data block addresses in at least one of the plurality of memories.

12. The method of claim 6, wherein the security breach module resets power to the first controller in response to the detected deviation.

13. The method of claim 6, wherein an internal controller of the hardware interposer selects a clock cycle to match the first controller while monitoring data access commands from the first controller, the matching clock cycle corresponding to no additional latency.

14. The method of claim 6, wherein an internal controller of the hardware interposer selects a clock cycle to match the first controller while initializing the first controller as part of a boot operation, the matching clock cycle corresponding to no additional latency.

15. The method of claim 6, wherein an internal controller of the hardware interposer blocks access through the hardware interposer to establish a secure path to upgrade firmware stored in a persistent memory connected to the hardware interposer.

16. The method of claim 6, wherein the security breach monitor blocks access through the hardware interposer for a second controller of the plurality of controllers in response to a detected deviation from a predetermined sequence of data access commands from the second controller.

17. The method of claim 6, wherein the security breach monitor blocks access through the hardware interposer for a second controller of the plurality of controllers in response to a detected command from the second controller not present in an allowed command list stored in the hardware interposer.

18. The method of claim 6, wherein the security breach monitor blocks access through the hardware interposer for the first controller while an internal controller of the hardware interposer conducts at least one test of the first controller to determine if the first controller has been compromised by a third-party attack.

19. The method of claim 11, wherein the security breach monitor tests a second controller of the at least one controller by reading an identification code of the second controller.

20. A method comprising:
   connecting a hardware interposer between at least one controller and at least one memory;
   testing a first controller of the at least one controller with a security breach monitor of the hardware interposer by requesting a predetermined sequence of commands from the first controller; and
   blocking access through the hardware interposer for the first controller in response to the predetermined sequence of commands not being returned from the first controller.

* * * * *